US006582232B1

(12) United States Patent
Ney

(10) Patent No.: US 6,582,232 B1
(45) Date of Patent: Jun. 24, 2003

(54) PAIN MANAGEMENT MODEL

(76) Inventor: Marshall James Ney, 321 Kirksville Rd., Richmond, KY (US) 40475

( * ) Notice: Subject to any disclaimer, the term of this patent is extended or adjusted under 35 U.S.C. 154(b) by 0 days.

(21) Appl. No.: 09/449,917

(22) Filed: Dec. 2, 1999

(51) Int. Cl.$^7$ .............................................. G09B 23/28
(52) U.S. Cl. .................. 434/270; 434/264; 434/274
(58) Field of Search ................................. 434/264, 267, 434/270, 274

(56) References Cited

U.S. PATENT DOCUMENTS

| | | | |
|---|---|---|---|
| 728,818 A | | 5/1903 | Wright |
| 1,194,017 A | * | 8/1916 | Harper ........................ 434/264 |
| 1,205,437 A | * | 11/1916 | Delabarre .................... 434/264 |
| 2,103,058 A | | 12/1937 | Burtenshaw ................... 32/71 |
| 3,009,265 A | * | 11/1961 | Bezark ........................ 434/270 |
| 3,376,645 A | | 4/1968 | Huff |
| 3,616,537 A | | 11/1971 | Shuchard, III ................. 32/71 |
| 3,646,680 A | | 3/1972 | Wollney et al. ................ 32/71 |
| 3,740,854 A | | 6/1973 | Black ............................. 32/71 |
| 4,096,645 A | * | 6/1978 | Mandl ......................... 434/264 |
| 4,209,919 A | * | 7/1980 | Kirikae ....................... 434/270 |
| 4,541,807 A | * | 9/1985 | Rolfs ......................... 434/264 |
| 4,601,664 A | | 7/1986 | Bertino, III et al. ......... 434/264 |
| 4,948,373 A | * | 8/1990 | Engels ........................ 434/270 |
| 4,968,256 A | | 11/1990 | Lang et al. .................. 434/263 |
| 5,071,354 A | * | 12/1991 | Lang .......................... 434/263 |
| 5,160,262 A | | 11/1992 | Alpern et al. ................. 433/58 |
| 5,320,528 A | | 6/1994 | Alpern et al. ................. 433/58 |
| 5,342,202 A | * | 8/1994 | Deshayes .................... 434/270 |
| 5,494,440 A | | 2/1996 | Silva et al. ................... 433/58 |

OTHER PUBLICATIONS

Dr. Jim Ney, *The Painful Reality . . . Helpful Hints for Pain Management*, 1992, St. Joseph Hospital, Lexington, KY, pp. 1–59.

* cited by examiner

Primary Examiner—Derris H. Banks
Assistant Examiner—Kurt Fernstrom
(74) Attorney, Agent, or Firm—Wood, Herron & Evans, L.L.P.

(57) ABSTRACT

A model for demonstrating referred pain. A human cranium and jaw are jointed to show a temporomandibular joint and tensionable connectors show muscles such as a trapezius muscle, neck muscle and jaw muscle. Tension can be regulated to demonstrate the effect on muscle stress and subsequent pain when the temporomandibular joint is in central relation or is out of central relation with the teeth maintained in central occlusion. The model allows a patient, student or clinician to visualize and demonstrate the concept of muscle tension resulting from jaw position and referred pain. A method and apparatus is disclosed.

17 Claims, 3 Drawing Sheets

PAIN MANAGEMENT MODEL

FIELD OF THE INVENTION

The invention relates to a physical model for demonstrating relief of pain, particularly referred pain, in the craniofacial region.

BACKGROUND OF THE INVENTION

Physical models are helpful to simulate the cause and effect of various orthopedic and neuromuscular processes. Abnormalities in these processes often result in pain. Because of the complex physical and physiological relationships among the vascular, neuromuscular, and orthopedic systems, models are useful to locate and visualize the intricate interplay among these systems in an attempt to correct the abnormality and thus relieve the pain.

Models are particularly useful to demonstrate relationships in the craniofacial and upper body areas, where structures are more compact and the interdependence of these structures is more readily visualized. For example, craniofacial muscle stress is a result of changes in torque or force vectors in the muscles and ligaments between the jaw and cranium. An example of one such muscle that may be stressed is the trapezius muscle. A stressed trapezius muscle refers pain to the head, leading to symptoms such as headache and joint pain. The trapezius muscle, located in the shoulder and neck and serving to support the head from the back, contains trigger points. Trigger points are one or more sites of irritable muscle tissue which are especially tender to squeezing or pressure. The trigger points usually cause the phenomenon of referred pain recognized at a position removed from their own location.

Referred pain is defined as pain in which an abnormality in a particular location results in pain being felt in a location distant from the source. The concept is complicated and is difficult for many individuals to comprehend. An example of referred pain is the pain in the left arm that is felt by an individual suffering a heart attack. While it is cardiac muscle (that is, the heart) that is deprived of oxygen, the pain is experienced in the arm. Less drastic muscle aggravation than that provoking a heart attack, for example skeletal muscle aggravation, can result from strenuous exercise, sudden movement, improper positioning for an extended duration, and so on. The aggravated muscles in one area of the body thus lead to muscle tension and pain in other areas of the body resulting from a complex series of elements, culminating in referred pain. If these elements can be relieved, the tension in muscles having trigger points will also be relieved and therefore will not refer pain to other areas of the body. The end result is that pain in other areas of the body, or referred pain, will be relieved.

Physical models of various body regions in general, and of the craniofacial region in particular, are well known. However, all suffer from the drawback that they do not demonstrate the phenomenon of referred pain. For example, U.S. Pat. No. 3,376,645 discloses a demonstration device that simulates proper and improper dental occlusion and its effect on the temporomandibular joint. The device includes bas-relief planar facsimiles of the human upper and lower jaws which are mounted on a planar support. The upper jaw is fixed while the lower jaw is removable and is adapted to pivot about the temporomandibular joint. By substituting alternative lower jaw facsimiles representing various malformations, including improper bite or occlusion, sliding or shifting of the lower jaw fore and aft can simulate the effect of the temporomandibular joint and muscles and ligaments in the face, head and neck.

Similarly, U.S. Pat. No. 3,616,537 discloses a demonstration device that includes upper and lower plates having representations of an upper and lower jaw and temporomandibular joint. The plates include slots and pins which may be adjusted to simulate different occlusions and their effect on the function of the temporomandibular joint.

As another example, U.S. Pat. No. 4,541,807 is a planar demonstration device similar to that disclosed in the aforementioned '645 patent but including a series of rubber bands to simulate various muscles that support the lower jaw. The device also includes a series of replaceable inserts to represent different improper bites or occlusions, and which cause movement at the temporomandibular joint. Another series of inserts function to correct an improper bite or occlusion and to move the temporomandibular joint back to its proper position.

As still another example, U.S. Pat. No. 4,948,373 discloses a three-dimensional model of the human craniomandibular system. A cranium is pivotally mounted to the first cervical vertebra, and a series of rubber bands simulate various muscle functions. Insert or enlargement pieces may be added to or removed from the lower jaw to simulate Angle Class I, II and III situations. Inserts may also be used to simulate patients in which the lower jaw is either horizontal or parallel to the upper jaw, or is upwardly or downwardly inclined with respect to the upper jaw.

Each of these models fails to account for the common effects leading to referred pain. For example, one source of referred pain is pain triggered by a trigger point in the trapezius muscle which is tensed or aggravated due to the non-coincident central occlusion of the teeth and central relation of the temporomandibular joint. The cranium in each of these models is fixed and cannot pivot or tilt downwardly, thus the models do not take into account, and hence do not simulate, normal and abnormal trapezius muscle function. Although the '373 patent uses rubber bands to simulate the effect of various muscles, it is a complicated three-dimensional device that does not account for the effects of coincident central relation and central occlusion, and furthermore does not show the effect of treatment of this problem. Because the concept of referred pain is difficult for many individuals to grasp, a visual model would be particularly useful in demonstrating the physiology underlying this complex phenomenon.

Muscles are cumulatively the largest single body organ and account for over forty percent of the body weight. Given the amount of stress and strain muscles endure, it is not surprising that many individuals suffer muscle pain. However, X-rays and other imaging techniques do not provide images of muscles. Thus, models demonstrating these complex relationships would have advantages in educating patients, physicians, therapists and other professionals who institute and monitor patient treatment, and in treating the patients who endure referred pain.

While a patient may not be able to grasp the complexities inherent in standard medical models, a model that clearly depicts the interrelatedness between abnormalities in craniofacial structures and sites of referred pain would facilitate a patient's understanding and education. This, in turn, would likely motivate and assist a patient in taking corrective action to alleviate the problem. Such a model is therefore needed.

SUMMARY OF THE INVENTION

The invention includes a model of a human craniofacial region functional to demonstrate relief of referred pain. A head comprises a cranium that is pivotally joined to a neck supported on a base. A jaw is connected to the cranium at a joint that simulates the temporomandibular joint. Tensionable connectors, for example rubber bands or springs, represent muscles such as the trapezius muscle and jaw muscle. Tension can be varied in these connectors to demonstrate effects between the positions of the cranium, jaw and muscles that can result in pain. The model also contains teeth and can demonstrate the teeth and temporomandibular joint in various positions. The model may be a physical model and may also include a device such as a splint inserted between the teeth to demonstrate how pain may be relieved.

The invention also includes a method for physically demonstrating a source of pain, particularly referred pain. A model is provided of a human cranium hinged to a base and a jaw jointed to the cranium to simulate the temporomandibular joint, containing teeth, and having tensionable connectors representing a state of muscle tension. The method includes varying the position of the head and teeth, varying the tension on the connectors, and/or inserting a splint to demonstrate the effect of jaw position and trapezius irritation as a source of pain, and the relief thereof.

There is thus briefly summarized a craniofacial model that is both easy to use and easy to understand, and methods of using the model to demonstrate the effect of source and relief of pain involving these structures. The invention will be further appreciated in light of the following drawings and detailed description.

DETAILED DESCRIPTION

Figure 1:
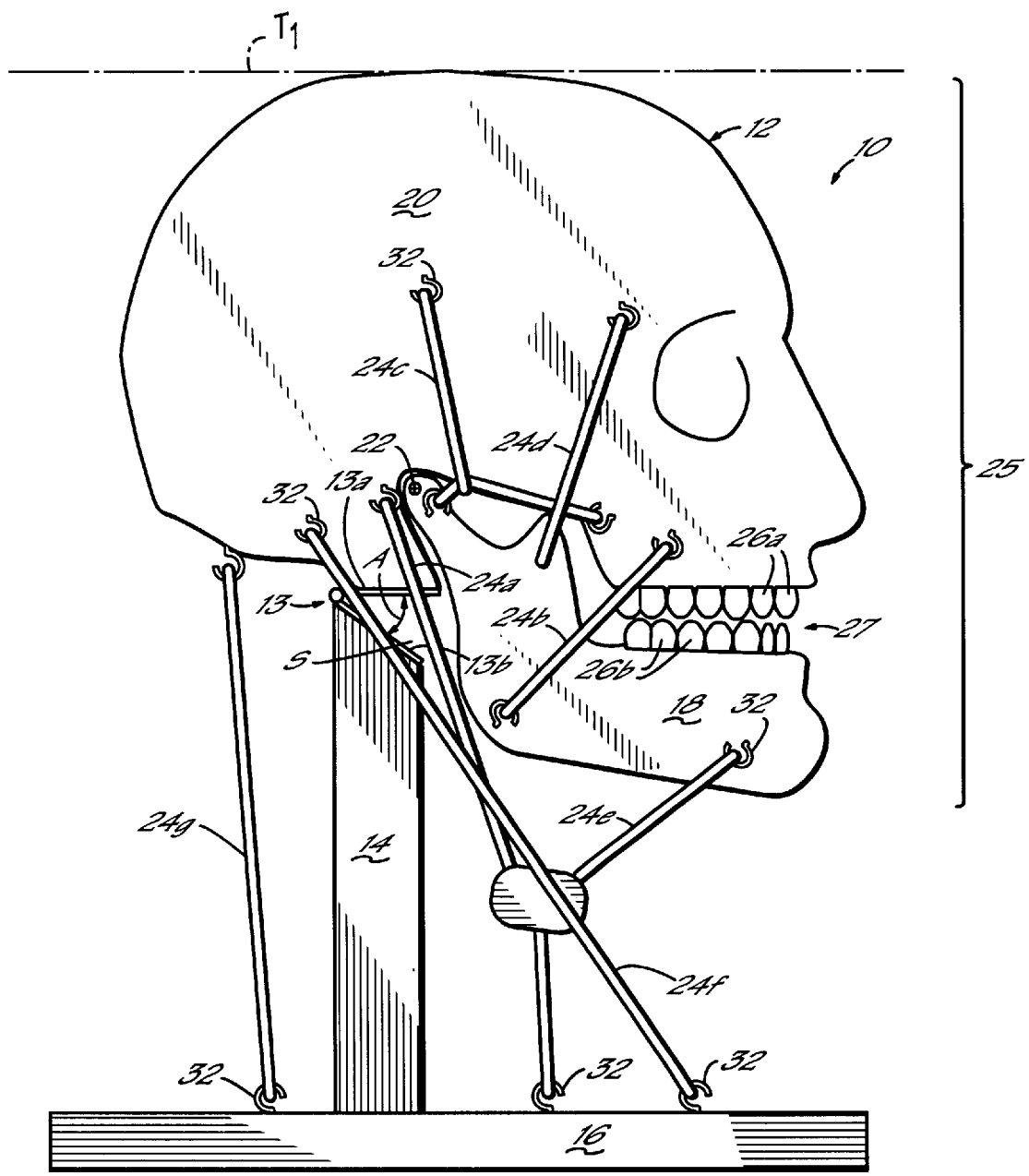
FIG. 1 is a front view of a model profile of a normal head.

With reference to FIG. 1, a model 10 demonstrating the normal position of the craniofacial region is shown. The model 10 comprises a human head 12 and neck 14 in profile. The head 12 and neck 14 are generally planar (i.e., ½" to 1" or so thick, for example) but could be of lifelike three dimensional configuration.

The model 10 is supported on a base 16 by neck member 14. Head 12 is pivoted to neck support member 14 by hinge 13. The hinge 13 defines a space S between members 13a, 13b at an angle A of about 45°. The space S permits the head 12 of the model 10 to tilt forward decreasing angle "A", for example, when it is desired to have the model simulate a stressed state of the muscles.

Figure 2:
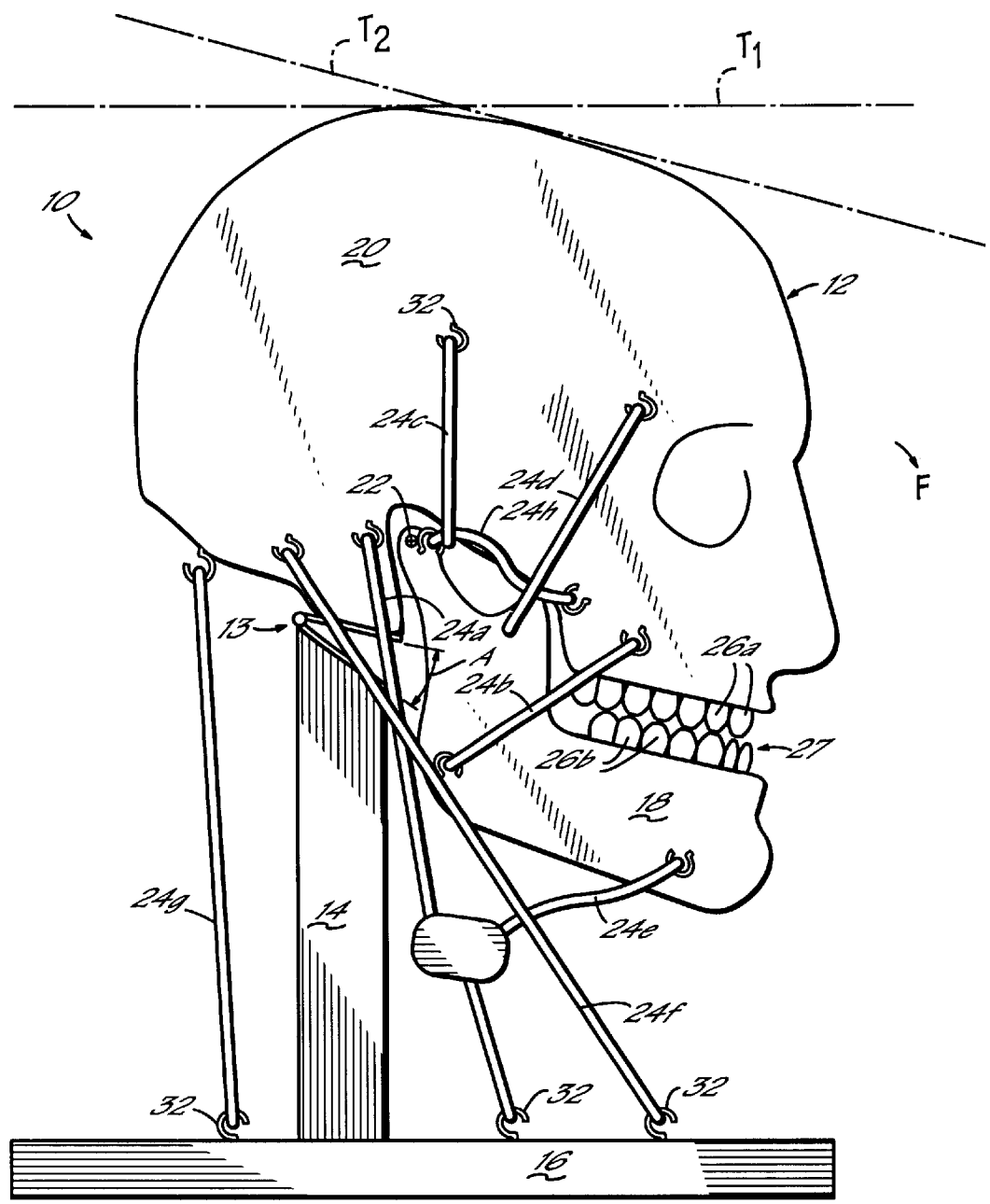
FIG. 2 is a front view of a model profile of a head having non-coincident central relation and central occlusion.

The model head 12 has at least a jointed jaw 18 separably connected to a replica cranium 20. The jaw 18 and cranium 20 are connected at the temporomandibular joint, illustrated at 22, by any type of tensionable connectors 24 such as rubber bands, elastic members, springs, etc. The tensionable connectors 24a–h represent muscles or muscle groups and can simulate either an uncontracted or relaxed state of the muscle, as well as a contracted or tensed state of the muscle. When trigger points in the neck muscles, such as the trapezius muscle, are activated, they refer pain as described above. In many cases the tension is caused by contraction of the jaw muscles such as represented by tensionable connectors 24b, 24d by, for example, a "bad bite", nighttime clenching of the jaw 18, nighttime grinding of the teeth 26, or other actions causing the jaw muscles to contract. The result is that the model head 12 reacts as a physiological specimen would react and tilts forward (F) as illustrated in FIG. 2, causing the neck muscles to contract even more to offset the extra tension in the jaw muscles to hold the head level. This extra tension in the neck muscles activates the trigger points in the neck 14, which then refer pain to the head. Manipulation of the model 10 fully demonstrates these relationships and the relief of pain caused thereby by reason of return to the central occlusion (CO) and central relation (CR) positions of the elements described above, respectively. For example, the model 10 may be used to demonstrate dysfunction in the craniofacial region 25 (with jaw and teeth in respective noncoincidental CR and CO positions, as will be described), which can spark trigger points in a muscle of the neck 14 and/or shoulder to then refer pain to the temple, side of the head, and/or above the eyes.

Any desired amount of tension in the muscles may be illustrated by tension in the respective tensionable connectors 24a–h, up to the point at which the stretched tensionable connector 24a–h will snap. This type of model 10 is thus useful when instructing patients in the consequences of their actions and/or craniofacial positions in terms of a partial or total relief from pain. As will be described with respect to FIG. 3, a splint returning the jaw and teeth to CR and CO eliminates excess muscle tension and trigger point activation, alleviating or relieving referred pain.

In one embodiment of the model of FIG. 1, upper teeth 26a and lower teeth 26b are included in the mouth 27. The top of the head 12 is substantially horizontal (horizontal line (T1)) when angle A is about 45°. In the normal state of the craniofacial region 25, the temporomandibular joint 22 assumes a CR position, where the joint 22 is centered and the upper and lower teeth 26a, 26b are meshed or engaged, defining a CO position. This results in the CO position of teeth 26a, 26b and CR position of the temporomandibular joint 22 being coincident, i.e., the joint 22 is properly seated in its socket and the teeth 26a, 26b are properly meshed. There is no muscle pain, since the muscles represented by tensionable connectors 24a–h need not strain in an attempt to attain these positions, and likewise there is no referred pain.

FIG. 2 illustrates the physical condition of body components wherein the upper and lower teeth 26a, 26b are not meshed in CO but overlapped, the joint 22 is unseated or out-of-socket and there is noncoincidental CR and CO. FIG. 2 illustrates the same muscle set as depicted in FIG. 1 but shows the increased amount of tension placed on the tensionable connectors 24a, 24b and a slackening of tension on the tensionable connectors 24e, 24h, just as in the human circumstance. This may be caused, for example, by stress and stress induced lower jaw positioning away from the unstressed position, illustrated in FIG. 1. As shown in FIG. 2, this tension in the jaw muscles modeled at 24a, 24b causes the head 12 to tilt forward F, decreasing angle A and increasing tension in tensionable connector 24g representing the trapezius muscle of the neck 14 and back in stretch or strain.

The trapezius muscle normally helps to stabilize the head 12 during head and neck movements such as chewing. It also pulls the head 12 backward and helps lift the arms. When the muscle is tensioned, such as by the tilting of the head 12 described above, it aggravates trigger points therein and pain is referred to the lateral portion of the head 12. The tension in the neck muscle, simulated as tension in the tensionable connectors 24f, 24g, activates the trigger points in the neck 14, which in turn refer pain to the temple, side of the head and above the eyes. Thus, to offset the tension in the tensionable connector 24b simulating the jaw muscle, and in an effort to return the head from a forward tilted position (T2) back to a substantially horizontal position (T1), the tensionable connector 24g simulating the trapezius muscle in the back, and the tensionable connector 24f simulating the muscle in the side of the neck are observed to contract. The forward tilt (T2) reaction of the head in response to noncoincidental CO and CR resulting from jaw muscle stress results in tension of connectors 24f and 24g illustrating the resulting tension in the neck and trapezius muscle. As shown in FIG. 2, this is clearly illustrated in the model 10 by the head 12 tilting forward (T2), stretching the tensionable connectors 24g in the back of the neck 14 representing the trapezius muscle and 24f representing the neck muscles.

Thus, in summary, when the CR and CO are not coincident, as when the teeth 26a, 26b are unmeshed and the joint 22 is unseated, the abnormal condition places a stress on the trapezius muscle, represented in the model as the tensionable connector 24g. While a natural urge in an unstressed position is to have the upper and lower teeth 26a, 26b mesh, meshing of the teeth 26a, 26b in a stressed condition results in the temporomandibular joint 22 being pulled out of CR. The temporomandibular joint 22 out of CR stresses muscles and causes the head 12 to tilt forward (T2). This position of the head 12 places a stress or tension on the tensionable connectors 24g and 24f representing the trapezius muscle and the neck muscle respectively, which in turn sets off trigger points to refer pain to the head 12.

Figure 3:
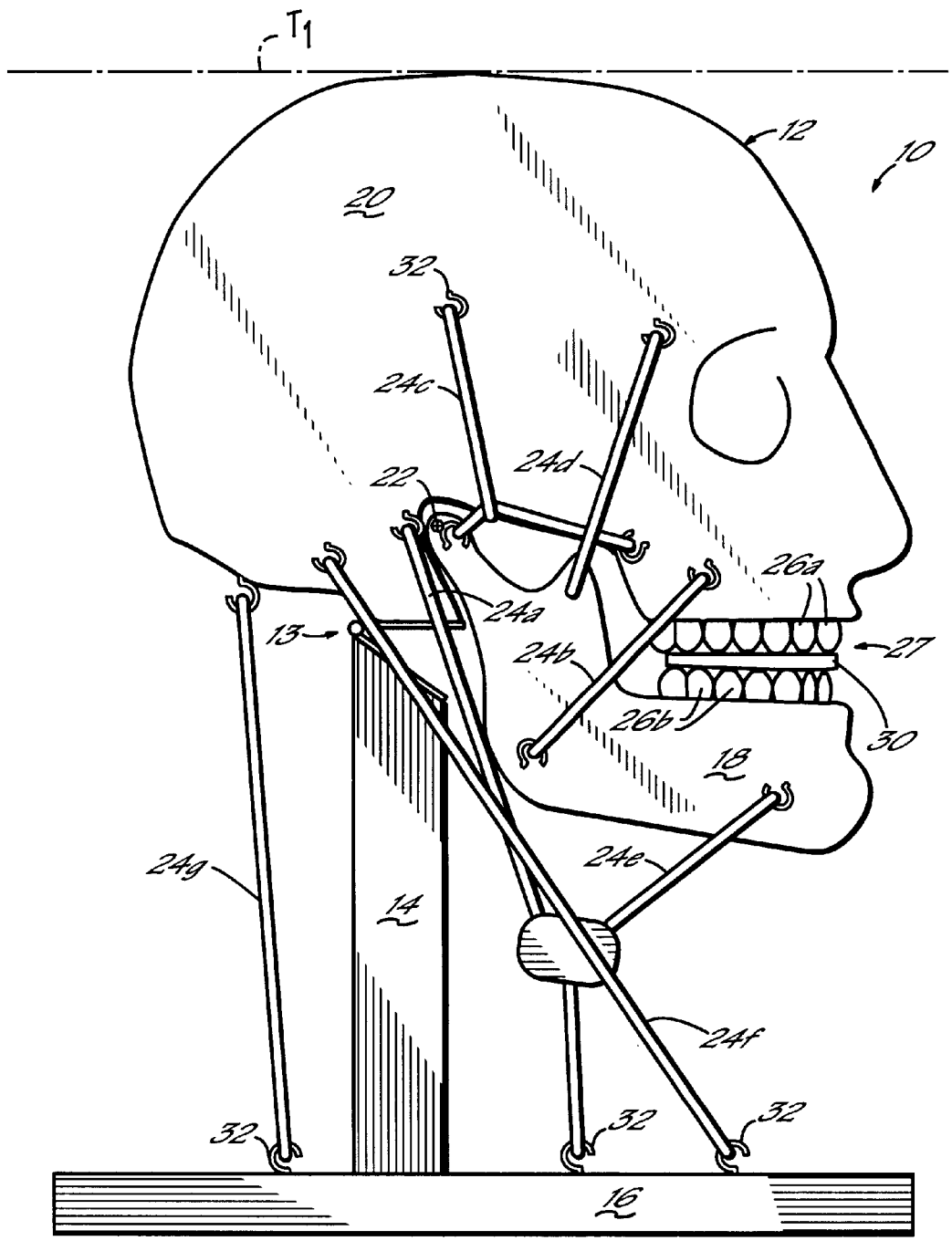
FIG. 3 is a front view of a model profile of a head during treatment for non-coincident central relation and central occlusion.

With reference to FIG. 3, to relieve the tension on the trapezius muscle and concomitantly to relieve the cause of the pain, a splint 30 is inserted into the mouth 27. The splint 30 allows the upper and lower teeth 26a, 26b to return to a mesh position (CO), with the temporomandibular joint 22 being in CR. Thus, the splint 30 restores the normal state of having a coincident CO and CR. As is easily visualized by the model 10 as shown in FIG. 3, the head 12 is horizontal (T1) and is not torqued or forced to tilt forward, so that the trapezius muscle and the neck muscle, represented by the tensionable connectors 24g and 24f respectively, are not tensed. Since the trapezius and neck muscles are not tensed, their trigger points are not aggravated, no pain is referred, and the referred pain that was manifested as a headache or a joint ache is relieved.

The model 10 may be a physical model that is life sized, less than life sized, or greater than life sized. The model 10 may be made out of any material that can be easily and fixedly connected by tensionable connectors 24 such as rubber bands to simulate muscles in a contracted, relaxed or normal state. Such materials include but are not limited to natural products such as wood, synthetic products such as hard plastic, styrofoam or other suitable material, and combinations of the above. The connections 32 that secure the tensionable connectors 24 to the model 10 or base 16 may be secured by any means that allow maximum elasticity of the tensionable connectors 24 without destroying their integrity. Examples of connectors 32 include, but are not limited to, hooks, pins, staples, clips, etc.

Furthermore, the model may be a computer-generated model depicting normal and stressed conditions of muscles graphically or visually.

From the above disclosure of the general method of the present invention and the preceding summary of the preferred embodiments, those skilled in the art will readily comprehend the various modifications to which the present invention is susceptible without departing from the scope of the invention. Therefore, applicant desires to be limited only by the scope of the following claims.

What is claimed is:

1. A model of a human head comprising a base, a neck supported on the base, a cranium, hinge means for pivotally joining the cranium to the neck, and a jaw movably connected to the cranium at a joint simulating a temporomandibular joint, the model having least a first tensionable connector connecting the cranium and the base, the first tensionable connector simulating a relaxed or contracted state of a trapezius muscle at least a second tensionable connector connecting the cranium and the jaw, the second tensionable connector simulating a relaxed or contracted state of a jaw muscle, and at least a third tensionable connector connecting the cranium and the base, the third tensionable connector simulating a relaxed or contracted state of a side neck muscle, for demonstrating conditions between the cranium, the jaw, and the muscles and a space between members of said hinge that forms an angle.

2. The model of claim 1 further comprising upper teeth in said cranium and lower teeth in said jaw.

3. The model of claim 2 wherein said teeth are in central occlusion when upper and lower are meshed, and said temporomandibular joint is in central relation when properly seated in its socket.

4. The model of claim 2 wherein said upper and lower teeth are not meshed, said temporomandibular joint is unseated, and said head is tilted forward decreasing the angle of said space.

5. The model of claim 1 further comprising a splint inserted between said upper teeth in said cranium and said lower teeth in said jaw, said splint restoring said upper and lower teeth to central occlusion and maintaining said temporomandibular joint in central relation.

6. The model of claim 1 wherein said tensionable connectors are selected from the group consisting of a rubber band, a spring, and an elastic member.

7. A method for demonstrating a pain source comprising
   providing a model of a human head simulating a cranium containing teeth, a neck supported on a base, hinge means for pivotally joining the cranium to the neck, a simulated jaw connected to said cranium at a joint simulating a temporomandibular joint and said jaw containing lower teeth, tensionably connecting the cranium to the base to simulate a relaxed or contracted state of a trapezius muscle and a side neck muscle, tensionably connecting the cranium to the jaw to simulate a relaxed or contracted state of a jaw muscle, tensionably connecting the cranium and jaw to the base to simulate a relaxed or contracted state of a neck muscle, and varying the position of the jaw to demonstrate resulting head movement and muscle tension to demonstrate the pain source.

8. The method of claim 7 wherein varying the jaw position includes tensioning at least one of said connectors.

9. The method of claim 7 including the further step of inserting a splint between said teeth in said jaw and said cranium to demonstrate resulting head movement and the alleviation of pain.

10. The method of claim 7 wherein the model is a physical representation comprising a simulated cranium, neck, jaw, teeth and muscles, the method further comprising manipulating the jaw position relative to the cranium to demonstrate muscle tension and pain source.

11. The model of claim 2 wherein said teeth are out of central occlusion and said temporomandibular joint is out of central relation.

12. The method of claim 7 wherein varying the jaw position includes varying the position of the temporomandibular joint.

13. A method for demonstrating alleviation of referred pain from a pain source comprising providing a model of a human head simulating a cranium containing teeth, a neck supported on a base, hinge means for pivotally joining the cranium to the neck, a simulated jaw connected to said cranium at a joint simulating a temporomandibular joint and said jaw containing lower teeth, tensionably connecting the cranium to the base to simulate relaxed or contracted states of a trapezius muscle and a side neck muscle, tensionably connecting the cranium to the jaw to simulate a relaxed or contracted state of a jaw muscle, tensionably connecting the cranium and jaw to the base to simulate a relaxed or a contracted state of a neck muscle, varying the position of the jaw to demonstrate resulting head movement and muscle tension to demonstrate the pain source, and inserting a splint between said teeth in said jaw and said cranium to demonstrate resulting head movement and the alleviation of referred pain.

14. The method of claim 13 wherein varying the position of the jaw includes tensioning at least one of said connectors.

15. The method of claim 13 wherein varying the position of the jaw includes varying the position of the temporomandibular joint.

16. The method of claim 13 wherein inserting a splint between said teeth in said jaw and said cranium alleviates tension at at least one of said connectors and varies the position of the temporomandibular joint.

17. The model of claim 1 wherein said head is tilted forward decreasing angle of said space.

* * * * *